US006742756B1

(12) United States Patent
Fimeri et al.

(10) Patent No.: US 6,742,756 B1
(45) Date of Patent: Jun. 1, 2004

(54) PIVOT WITH A DETENT

(75) Inventors: Gary Gordon Leslie Fimeri, Morphett Vale (AU); Robert William Gilbert, Willunga (AU); Maarten Johannes Schuurmans, Kingswood (AU)

(73) Assignee: Schefenacker Vision Systems Australia Pty Ltd, Lonsdale (AU)

( * ) Notice: Subject to any disclaimer, the term of this patent is extended or adjusted under 35 U.S.C. 154(b) by 0 days.

(21) Appl. No.: 09/890,626

(22) PCT Filed: Feb. 4, 2000

(86) PCT No.: PCT/AU00/00068

§ 371 (c)(1),
(2), (4) Date: Aug. 2, 2001

(87) PCT Pub. No.: WO00/46071

PCT Pub. Date: Aug. 10, 2000

(30) Foreign Application Priority Data

Feb. 5, 1999 (AU) .............................................. PP8536

(51) Int. Cl.⁷ .............................. B60R 1/02; G02B 7/18
(52) U.S. Cl. ........................ 248/479; 359/877; 359/841; 248/478
(58) Field of Search ................................ 248/479, 549, 248/475.1, 476, 477, 478; 359/841, 877; 403/119; 464/36

(56) References Cited

U.S. PATENT DOCUMENTS

| 4,523,735 A | * | 6/1985 | Beck et al. .................. 248/476 |
| 4,626,084 A | * | 12/1986 | Kumai ........................ 359/841 |
| 4,789,232 A | * | 12/1988 | Urbanek ..................... 248/549 |
| 4,988,068 A | | 1/1991 | Yamana et al. |
| 5,190,499 A | | 3/1993 | Mori et al. |
| 5,432,640 A | * | 7/1995 | Gilbert et al. .............. 359/841 |
| 5,477,392 A | * | 12/1995 | Mochizuki et al. ......... 359/841 |
| 5,557,476 A | * | 9/1996 | Oishi ......................... 359/841 |
| 5,678,945 A | * | 10/1997 | Fimeri ........................ 403/92 |
| 5,734,517 A | | 3/1998 | Kang |
| 5,828,504 A | * | 10/1998 | Beuzeville .................. 359/841 |
| 6,092,778 A | * | 7/2000 | Lang et al. ................. 248/478 |
| 6,109,586 A | * | 8/2000 | Hoek ......................... 248/476 |
| 6,322,221 B1 | * | 11/2001 | van de Loo ................ 359/841 |

FOREIGN PATENT DOCUMENTS

| EP | 0345756 | 12/1989 |
| JP | 8216783 | 8/1996 |
| JP | 08310301 | 11/1996 |
| JP | 11245728 | 9/1999 |

* cited by examiner

*Primary Examiner*—Anita King
(74) *Attorney, Agent, or Firm*—Warn, Burgess & Hoffmann, P.C.

(57) ABSTRACT

This invention is a pivot assembly 10 that connects mirror head 11 and a mirror mounting bracket 12 of a rear vision mirror that comprises a spigot 17, a plate 14 with an aperture 26 that is journalled to the spigot 17. A detent is located between the plate 14 and the spigot 17 which holds these components together to in turn hold the mirror head 11 in at least one required position with respect to the mirror mounting bracket 12. The detent changes from a locked position where the plate 14 is held with respect to the spigot 17 to a disengaged position when the plate 14 is rotated with respect to the spigot 17. A spring 40 acts against the detent to hold it in its locked position. The spring 40 yields to allow the detent to move to its disengaged position as the plate 14 is rotated with respect to the spigot 17. An attachment mechanism is provided both on the spigot 17 and the plate 14 that allows the spigot 17 to be secured to either one of the mirror head 11 or mirror mounting bracket 12. The plate 14 also has an attachment mechanism which allows it to be secured to the remaining component so that the mirror head 11 can be rotated with respect to the mounting bracket. The invention provides a pivot assembly 10 which is modular in nature and enables standardization of a pivot between various mirror head 11 and mirror mounting bracket 12 designs.

30 Claims, 11 Drawing Sheets

PIVOT WITH A DETENT

This invention relates to a pivot assembly incorporating a detent that is used to connect a mirror head and mirror mounting bracket of a rear vision mirror. In particular, it relates to a pivot assembly having attachment means which enables it to be secured between a mirror head and mirror mounting bracket.

BACKGROUND OF THE INVENTION

Vehicle mirrors, in particular, external side rear view mirrors, normally comprise a mirror head which is pivotally attached to a mounting bracket. The mounting bracket is in turn secured to the motor vehicle body. The pivot enables the mirror head to rotate with respect to the bracket to either allow movement of the mirror head if it is impacted either while the vehicle is moving or stationery (referred to as "mirror break away") or to move to a parked position under the action of drive means incorporate the mirror head to ensure that the mirror head is moved to position where it is as close to the vehicle body as possible.

A detent is normally used in the pivot. This provides a positive location and holding force for the mirror in various positions as it is rotated about the pivot. The detents resist initial movement of the pivot and require a minimum force in order to overcome the detent force.

Such detents are common practice in the field, and normally comprise either circular balls held between a surface of the mirror head and mounting bracket which locate within recesses or abutting ramped surfaces. The holding force is provided by a spring which is normally a coil spring located around a vertical spigot. The spigot is normally incorporated into the mounting bracket and the mirror head has an aperture which locates over the spigot. One disadvantage of this is the fact that the spigot on the bracket and the aperture within the mirror head tend to position the mirror further outward than might be desirable. This imposes certain limitations of the design of the mirror head which impact on its stability and ability to resist vertical loads. It also means the use of more robust materials such as die-cast components which are more expensive, and increases the amount of material required to manufacture the mirror.

The aim of the invention is to design a new style of pivot connection between a mirror head and mirror mounting bracket and to also address the problems referred to above.

SUMMARY OF THE INVENTION

In its broadest form, the invention is a pivot assembly connecting the mirror head and mirror mounting bracket of a rear vision mirror comprising:
  a spigot;
  a plate;
  an aperture in said plate journalled to said spigot;
  a detent between said plate and spigot that changes from
    a locked position, where said plate is held with respect to said spigot, to a disengaged position by rotation of said plate with respect to said spigot;
  a spring acting against said detent to hold it in said locked position, said spring yielding to allow said detent to move to a disengaged position as said plate is rotated with respect to said spigot; and
  attachment means on both said spigot and plate that allow said spigot to be secured to either one of said mirror head or said mirror mounting bracket and said plate to be secured to either one of said mirror head or said mirror mounting bracket to enable said mirror head to be held, or rotated with respect to said mirror mounting bracket.

One main advantage of the pivot assembly is its modular nature which enables a standard design of pivot assembly to be utilized between any mirror head and mounting bracket. All that is required is to standardize the area of the mirror head and mounting bracket between which the pivot assembly is located.

The invention also enables the pivot assembly to have a relatively small height by comparison to existing spigots. This in turn allows the glass of the mirror head to be placed further inboard and over the mirror mounting bracket which is not possible with existing spigot designs. This in turn reduces the moment arm of the mirror arm and decreases the amount of material required for manufacture of the mirror head.

There may be several means of attaching the pivot assembly to the rear vision mirror. In one instance, the pivot assembly may have a first and second plate which are spaced and parallel with one plate located above the other and attached to the mirror head, the lower plate being attached to the mirror mounting bracket. Alternatively, the invention may comprise a spigot and plate where the spigot is attachable either to the mirror head or the mounting bracket. For example, in the case of a mirror head that may be supported by one or more arms to the mounting bracket, the pivot assembly can be located within the arm with a vertical pin or bolt securing the spigot with respect to the mounting bracket.

A number of attachment means may be used to secure the pivot assembly between the mirror head and mounting bracket. These may include threaded fasteners which locate through plate elements and engage corresponding surfaces within the mirror head or mounting bracket or they may include pins or bolts which locate through the center of the spigot to thereby secure the spigot with respect to either of the components.

In addition, the attachment means may comprise elements which enable quick and easy attachment of the pivot assembly to the various components. For example, tabs or other projections which can locate into the apertures and be slid into position so that the tabs hold the pivot assembly with respect to the mirror head or mounting bracket. Non-return catches can be used to hold the pivot assembly in place and to prevent disengagement of the tabs from their apertures.

A variety of detents can be used. These may incorporated indentations and projections formed within first and second plates, or may also comprise detent elements which are held in recesses or notches between the rotating components. In both cases, the detents are held in their engaged or locked positions by a spring which can yield sufficiently to enable disengagement of the detents.

Preferably, the spring comprises a concave disc which may also have a negative spring rate as it yields during disengagement of the detent. A concave disc have a positive spring rate which changes to a negative spring rate as it is flexed towards a flattened position. This is an inherent property of such a design, and the degree of pre-tension load can be varied by changing material, material thickness, the degree of concavity, and the number of concave spring plates which are stacked together.

The use of a spring having a negative spring rate is that maximum force is applied to the detent at its pre-loaded position and that upon force being applied to the spring, the load applied to the detent reduces so that the force or torque required to rotate the mirror head also reduces. This provides maximum holding force while at the same time reducing the force required to rotate the mirror head once this holding force has been overcome.

An advantage of the use of the spring in the form of a concave disc is the significant reduction in height requirement by comparison to conventional coil springs. This in turn means that the pivot requires less vertical space thereby enabling the mirror to be positioned more inboard and over the mirror mounting bracket than otherwise possible. Accordingly, the concave disc spring will also have application in existing mirror pivot designs.

Various components of the pivot assembly are preferably produced from stamped metal components. However, other manufacturing processes such as casting, sintering or machining may also be used.

Further, the invention may also comprise a drive means which can be used to rotate the mirror head to the parked position. In this case, the detent acts as an override clutch which enables the mirror head to rotate should the mirror be subject to a break-away force or become jammed while being rotated to a parked position. This will prevent gears used in the drive means from stripping when break away or jamming of the mirror head occurs.

DESCRIPTION OF THE DRAWINGS

In order to fully understand the invention, the preferred embodiments will now be described. However, it should be realized that the invention is not to be confined or restricted to the details of these embodiments.

The embodiments will be illustrated in the accompanying figures in which.

DETAILED DESCRIPTION OF THE PREFERRED EMBODIMENTS

Figure 1:
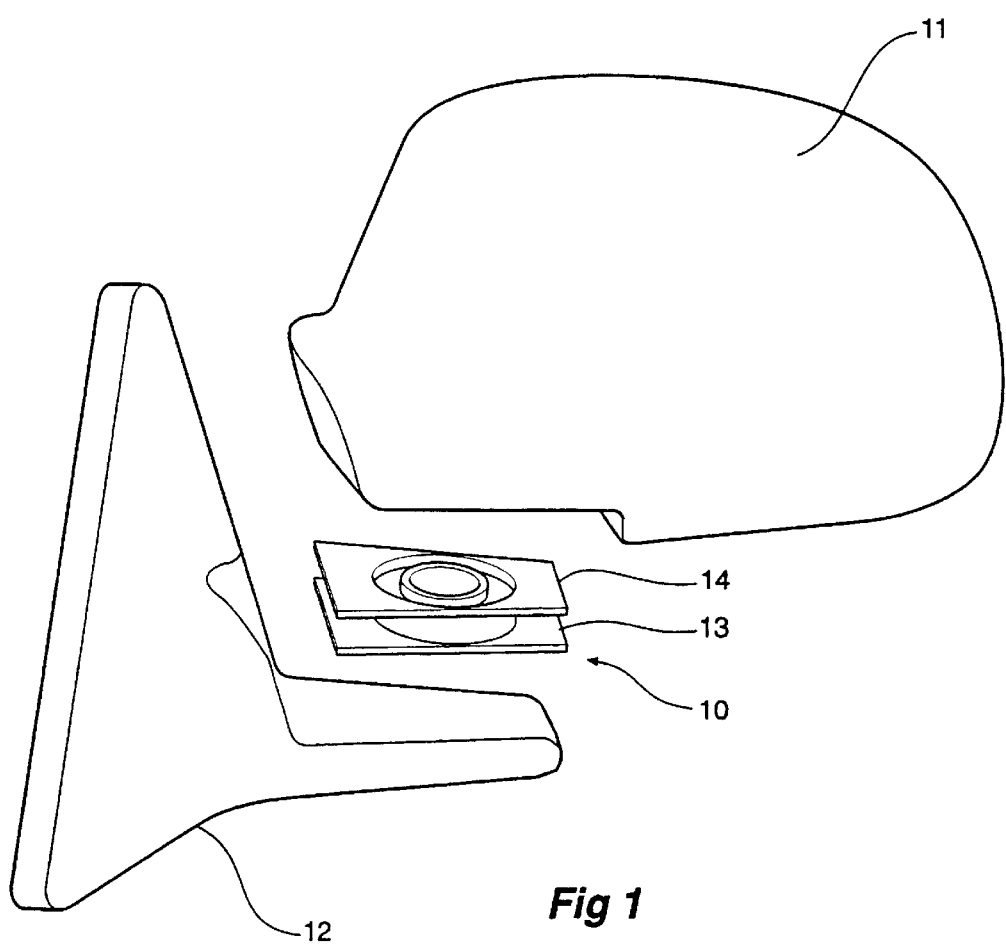
FIG. 1 is an exploded perspective view of a mirror head, mirror mounting bracket and a pivot assembly.

FIG. 1 shows a pivot assembly 10 that is used to connect a mirror head 11 to a mirror mounting or vehicle bracket 12. The vehicle bracket 12 is secured to a motor vehicle, and the pivot assembly 10 is used to connect the mirror head 11 securely in its deployed or operative position while at the same time allowing the mirror head to rotate with respect to the vehicle bracket 12. This enables the mirror head 11 to be manually moved to a parked position, or to "break away" if it is impacted or hit either while the vehicle is moving or stationery.

Figure 2:
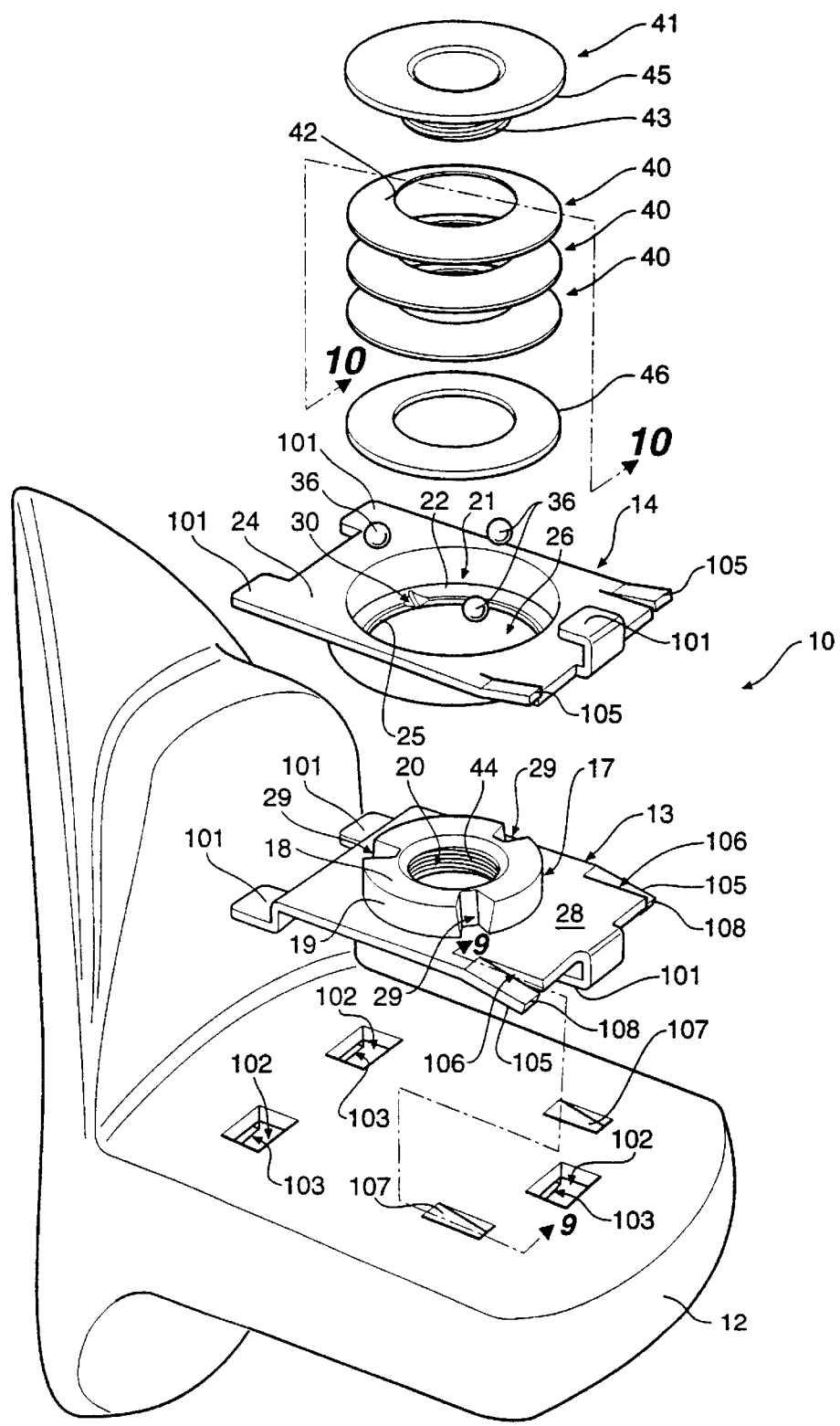
FIG. 2 is an exploded view of a pivot assembly and a mirror mounting bracket according to a first embodiment.

Referring to FIG. 2, the pivot assembly 10 comprises a first and second plate which in this embodiment comprises bracket plate 13 which is attached to the vehicle bracket 12 and a case plate 14 which is rotatably mounted to the bracket plate 13. The case plate 14 is in turn attached to the mirror head 11.

Figure 3:
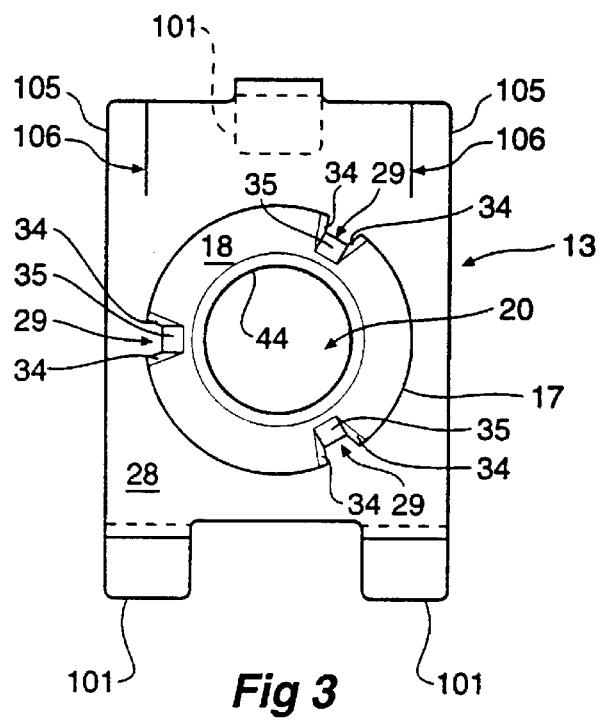
FIG. 3 is a plan view of a bracket plate of the first embodiment.

A spigot 17 projects away from the bracket plate 13 shown also in FIG. 3. In this embodiment, the bracket plate 13 is a pressed metal component with the spigot being formed as part of the pressing operation. The spigot 17 has an upper surface 18, a cylindrical wall forming a bearing surface 19 and an aperture 20.

Figure 4:
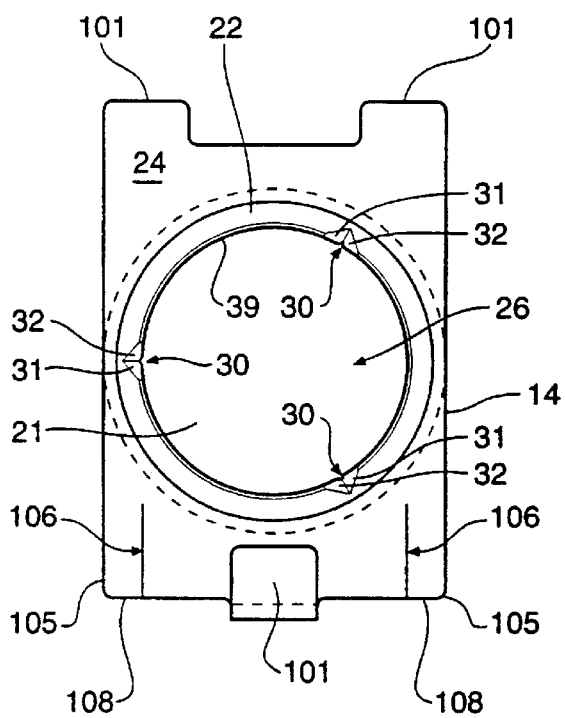
FIG. 4 is a plan view of a case plate of the first embodiment.

The case plate 14 shown in FIG. 4 is also a pressed metal component. It comprises a substantially planar plate or upper plate 24 with a centrally located depression 21. The depression 21 comprises a circular flange 22 and a wall 23 surrounding the flange 22. A bearing surface 25 defines an aperture 26 within the circular flange 22. The thickness of the circular flange 22 in this embodiment is less than the height of the bearing surface 19 on the spigot 17 and the aperture 26 is journalled for rotation around the bearing surface 19 of the spigot 17. It may be that, in normal operation, there is no contact between bearing surfaces 19 and 25 and that a clearance is maintained. However, even in this example, in certain load conditions there will be contact between bearing surfaces 19 and 25.

The bracket plate 13 has a support surface 28 which extends around the base of the spigot 17. The support surface 28 is engaged by the lower surface of the flange 22. The extent of the surface area of the flange 22 engaging with the support surface 28 provides a stable connection between the bracket plate 13 and the case plate 14. This prevents rocking movement between the mirror head 11 and vehicle bracket 12 in normal use.

Detents are provided between the bracket and case plates 13 and 14. These detents are used to hold the case plate 14 in a predetermined position with respect to the bracket plate 13. In this embodiment, the detents comprise a number of notches that are formed on the intersection between the bearing surfaces 19 and 25, and detent elements, which in this embodiment comprise steel balls that are located within the notches. The detent elements are held in place to prevent relative rotation and to lock the detent until the detent elements are disengaged from one of the two aligned notches.

Figure 5:
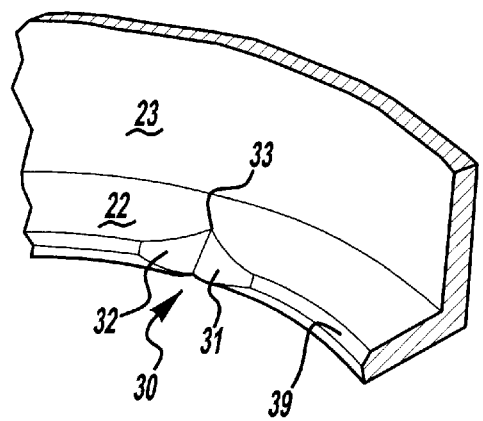
FIG. 5 shows a segmented view of the wall and flange of the case plate shown in FIG. 4.

Referring to FIG. 2, radially spaced recesses comprising notches 29 and 30 are formed in the edge of the aperture 26 and the spigot 17 respectively. In this embodiment, the notch 30 (see FIG. 5) is a v-shaped notch further comprising a pair of angled surfaces 31 and 32. There are three pairs of such notches 29 and 30 which are spaced around the spigot 17. The pair of angled surfaces 31 and 32 result in a v-shaped notch in plan view that has decreasing depth from the periphery of the flange 22 to the inner cusp 33.

The notch 29 comprises a pair of side walls 34 and a sloped rear wall 35.

The detent elements comprise steel balls 36. When the notches 29 and 30 align, the diameter of the steel ball is such that it abuts against the angled surface of 31 and 32 of notch 30 and the side walls 34 of notch 29. The side walls 34 are angled so that the opening of notch 29 is wider than the rear wall 35. This ensures that the steel balls 36 will abut against the side walls 34 and enables a clearance to be maintained between the steel balls 36 and the rear wall 35. Provided that a downward force is, applied to the steel balls 36, then the case plate 14 is restrained with respect to the spigot 17.

When sufficient rotation forces are applied to the case plate 14, the angled surfaces 31 and 32 will apply force to the ball 36 which will be resisted by the opposite side wall 34. Because of the difference in angles between the respective surface 30 or 31 and the side walls 34, the angled surfaces 31 and 32 will push the ball 36 into the notch 29. At the same time, the movement of the notch 30 with respect to notch 29 will cause the ball to be lifted and pushed upwardly and into notch 29 as the ball 36 disengages from the notch 30. The notch 29 slopes away from notch 30 which assists in the upward movement of the balls 36. Accordingly, the rear wall 35 slopes away from the notch 30 so that clearance with the steel balls 36 is maintained.

The periphery of the flange 22 has a chamfered edge 39. When the notch 30 is moved out of alignment of the notch 29, the balls 36 will be raised so that they rest against the chamfered edge 39 and the walls 34 of the notch 29. Accordingly, the balls 36 will be in a raised position with respect to the flange 22 When the notches 29 and 30 are out of alignment, and will be at a lower level when the notches 29 and 30 are aligned.

A spring is used to apply downward force to each of the steel balls 36 which in turn provides the necessary resistance to rotation of the case plate 14 with respect to the spigot 17. In this embodiment, a pair of springs 40 are used which each comprise a concave disc with a center aperture 42. In this embodiment, the diameter of the springs 40 is approximately 36 mm and the diameter of the aperture 42 is approximately 20 mm. The thickness of the material used to produce the spring 40 is approximately 0.3 mm and is hardened carbon steel. The metal disc is conical in cross section with the periphery of the aperture 42 approximately 2 mm higher than the outer periphery of the spring 40. This results in a concave spring 40.

The threaded retainer 41 has a threaded shaft 43 that engages within a threaded aperture 44 within the spigot 17. The shaft 43 locates through the apertures 42 in the springs 40 so that the periphery of the aperture 42 abuts against the end flange 45 of the retainer 41.

Figure 10:
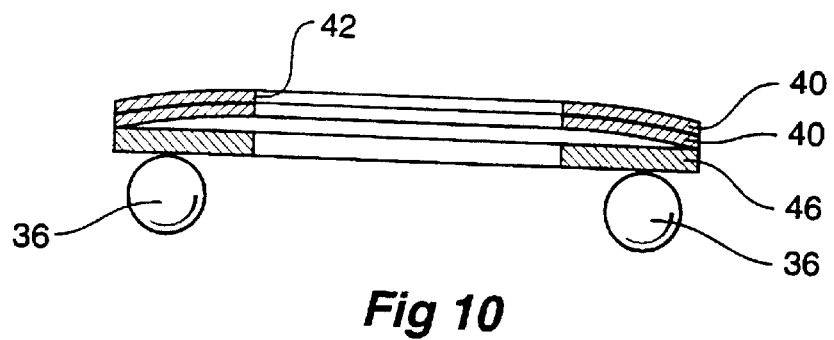
FIG. 10 shows a cross-sectional assembled view of springs, washer and detent elements used in the first and second embodiment.

A washer 46 is located on top of the spigot 17. As seen in FIG. 10, the washer 46 provides a surface against which the outer periphery of the lower spring 40 abuts. The steel balls 36 project slightly above the upper surface 18 of the spigot 17 even when the notches 29 and 30 align. Accordingly, the washer 46 abuts against the steel balls 36 rather than the upper surface 18 of the spigot 17.

Figure 11:
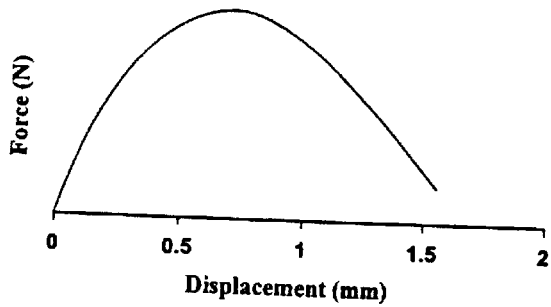
FIG. 11 is a graph that plots the spring force against displacement of the springs used in all the embodiments.

The threaded retainer 41 can be used to pre-load the springs 40 against the balls 36. This compression will tend to flatten but the springs 40. The design of the spring is such that the spring force will increase to a maximum pre-load force but this force will then decrease as the spring further flattens. Spring force against deflection is shown in FIG. 11. The effect is a decreasing spring force as the deflection increases from the maximum pre-load position due to a negative spring rate.

Accordingly, the springs 40 can be pre-loaded so that they apply the maximum force to the balls. Any further deflection of the springs 40 as the balls 36 rise will result in a reducing force being applied to the balls 36. Accordingly, maximum detent holding force will be required when the balls 36 are engaged within the aligned notches 29 and 30 and that the force applied to the balls 36 will in fact reduce as they are lifted through rotation of the case plate 14 with respect to the spigot 17.

Upon a rotational force being applied to the case plate 14 via the mirror head 11, then, depending on the direction of rotation, either angled surfaces 31 or 32 will apply force to each of the balls 36. The angled surfaces 31 or 32 will push the steel ball 36 into the notch 29 while at the same time lifting it upwardly. This upward movement is resisted by the springs 40, although a continued upward movement of the springs 40 results in a reduction of the spring force. Once the required initial torque is applied to the mirror head 11, the steel balls 36 will then progressively be easier to disengage from the notch 30. When the steel balls 36 are fully raised, they will be held between notches 29 and the chamfered edge 39.

The steel balls 36 will remain in this raised position until the notches 29 and 30 are once again brought into alignment. Further notches 30 may be provided at intermediate positions to act as further detents to hold a mirror in a parked position. In either case, when the notches 30 again align with the notches 29, the balls 36 will again have the maximum pre-load force applied by the springs 40 and will therefore positively hold the case plate 14 with respect to the spigot 17.

The use of the free floating ball bearings which self-center within the aligned notches 29 and 30, means that there are reduced requirements in ensuring concentricity between the various rotating components. The use of a three point loading system that is obtained using the three sets of notches 29 and 30 ensure that there can be no free play between the bracket and case plates 13 and 14. Further, the arrangement will be self-centering.

The increased surface area contact between the flange 22 and the support surface 28 will result in reduced rocking of the mirror head 11 and the ability to contain lubricants within the depression 21 of the case plate 14. The extent of surface area between the flange 22 and the support surface 28 will minimize the loss of lubricants or the entry of contaminants or corrosive fluids into the case plate 14.

Figure 6:
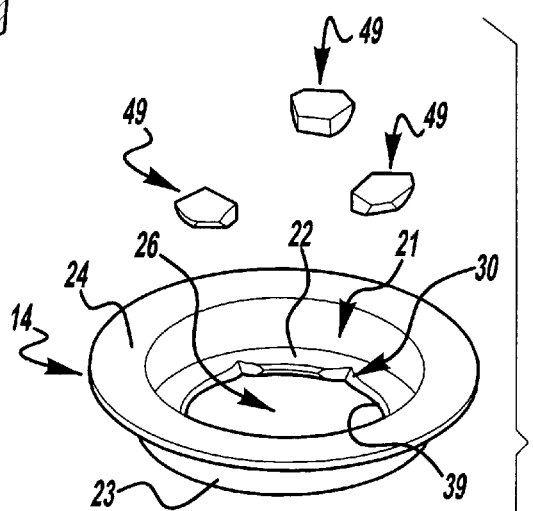
FIG. 6 is a partial exploded view of a pivot assembly of an alternate embodiment.
Figure 7:
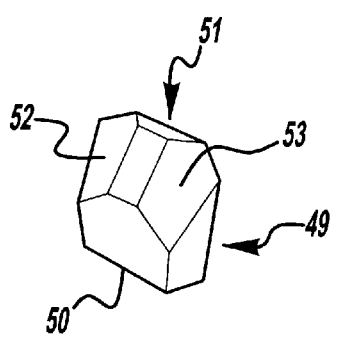
FIGS. 7 and 8 show perspective views of the detent elements shown in FIG. 6.
Figure 8:
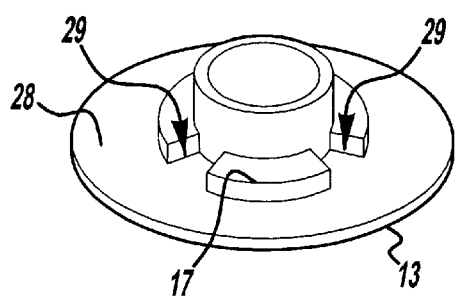

As an alternative to the steel balls 36, FIGS. 6 through 8 shows steel blocks 49 which are shaped to locate both within notch 29 and 30. In this embodiment, the rear end 50 has a generally rectangular cross section which is located within notch 29. The forward end 51 of the block 49 has a pair of angled surfaces 52 and 53 which engage the notch 30 so that the surfaces 52 and 53 abut against the surfaces 31 and 32. This provides a greater contact area by comparison to the steel balls 36.

The rest of the assembly shown in FIG. 6 is the same as that shown in FIG. 2. A washer 46 locates on top of the blocks 49 and the springs 40 held against the washer 46 by a threaded retainer 41. Rotation of the case plate 14 with respect to the spigot 17 tends to rock the forward end 51 of the blocks 49 upwardly and this movement is initially resisted by the springs 40.

Figure 13:
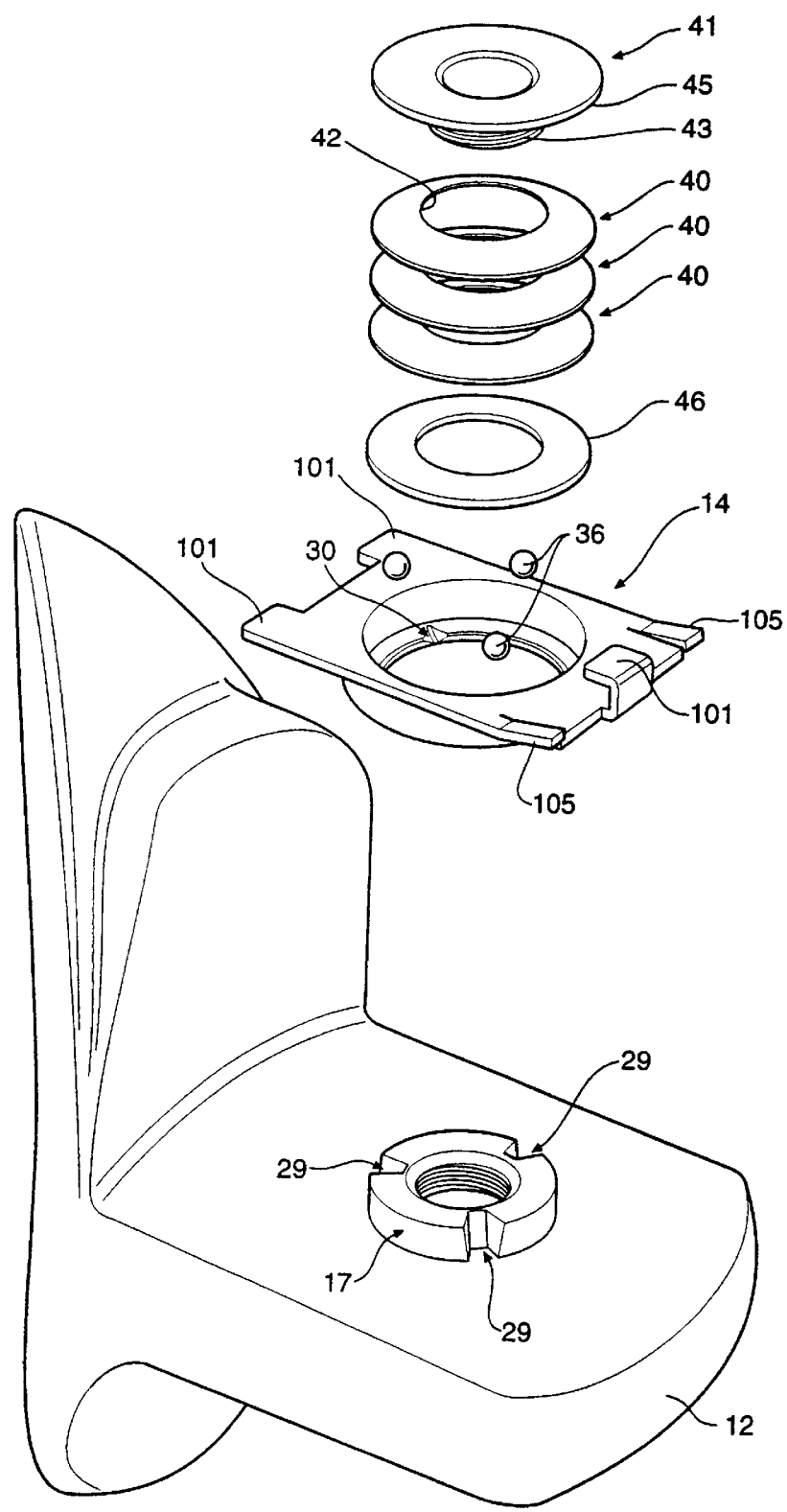
FIG. 13 shows an exploded view of a pivot assembly and a mirror mounting bracket according to the first embodiment showing the spigot as part of the mirror mounting bracket.

An alternative for the first embodiment is shown in FIG. 13. In this embodiment, the spigot 17 is part of the vehicle bracket 12. This can be achieved either by a die-cast or molded insert for the bracket 12, or securing the spigot 17 to the bracket 12 via a threaded fastening, a bayonet fitting, or threaded fasteners. The case plate 14 secures to the mirror head 11 in the same manner as described in the first embodiment. The pivot functions in exactly the same way as that described in the first embodiment.

Another variation that would be possible would be to make the case plate 14 part of the mirror head 11 in addition to incorporating the spigot 17 into the bracket 12. Alternatively, the case plate 14 may be incorporated into the mirror head 11 While using a bracket plate 13 similar to that shown in FIGS. 2 and 3.

Figure 14A:
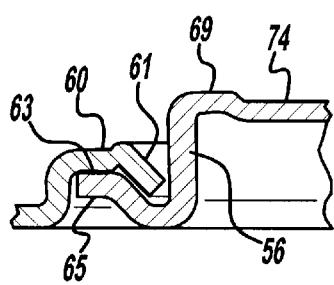
FIG. 14a shows a partial cross-sectional view of the spigot flange, ridge in the plate and bearing surface on the underside of the ridge.
Figure 14:
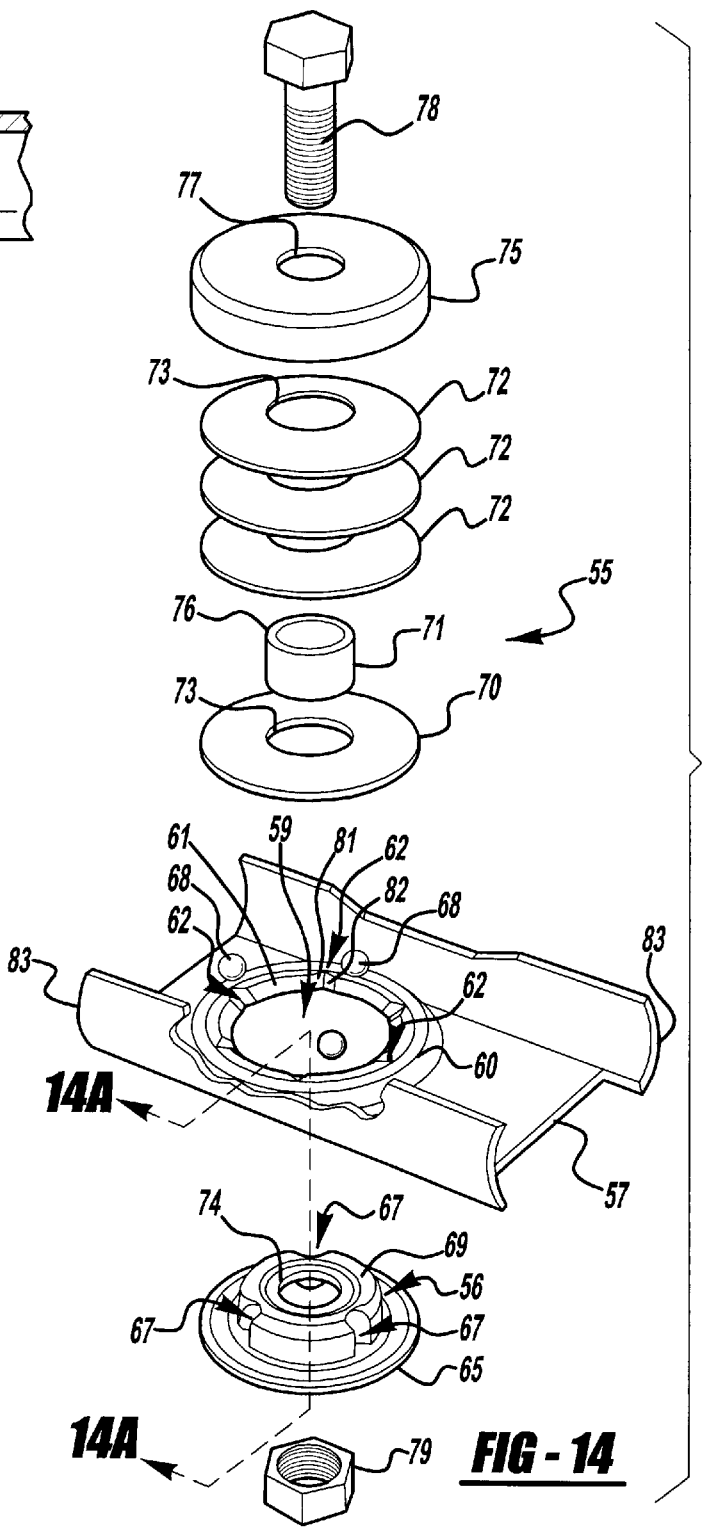
FIG. 14 shows an exploded view of a pivot assembly according to a second embodiment.

A second embodiment is shown in FIG. 14. In this embodiment, the pivot assembly 55 comprises a spigot 56 and a plate 57. The plate 57 has an aperture 59 which locates around the spigot 56. The aperture 59 is formed in the center of a raised circular ridge 60 which is formed by a pressing operation into plate 57. The pressing operation forms the aperture 59, a chamfered edge 61, a plurality of v-shaped notches 62 and a circular bearing surface 63 on the underneath surface of the ridge 60 (see FIG. 14a). The spigot 56 is provided with a circular flange 65 which locates within the recess formed by the ridge 60 on the underneath surface of the plate 57. The circular flange 65 abuts against the circular bearing surface 63 on the underneath surface of the ridge 60 and the depth of the recess formed by the ridge 60 is to ensure that the base of the spigot 56 and the circular flange 65 do not project below a surface of the plate 57.

The spigot 56 and circular flange 65 are also formed from a pressed metal component. The spigot 56 has three notches 67 pressed into its periphery. Notches 67 align with three of the v-shaped notches 62.

The detents comprise steel balls 68 in combination with the v-shaped notches 62 and notches 67. As with the first embodiment, the steel balls 68 are located between the aligned v-shaped notch 62 and notch 67 and, in conjunction with force applied by springs, hold the plate 57 with respect to the spigots 56.

The balls 68 project slightly above the upper surface 69 of the spigot 56 when in place between adjacent notches 62 and 67. This enables a washer 70 to be located above the upper surface 69 of the spigot 56 and bear against the steel balls 68. A bush 71 is used to align the washer 70 together with three springs 72. The washer 70 and springs 72 have a central aperture 73 which are located around the bush 71. The bush 71 sits on a circular depression 74 within the upper surface 69 of the spigot 56. A cap 75 covers the assembly of the springs 72 and washer 70. The upper surface 76 of the bush 71 abuts against the inside surface of the cap 75. The aperture 77 in the cap 75 is the same diameter of the internal diameter of the bush 71.

The whole assembly 55 is held together by a bolt 78 and a nut 79. The longitudinal height of the bush 71 ensures that tightening of the bolt 78 will result in the cap 75 compressing the springs 72 and applying a pre-load. The springs 72 in this embodiment are the same as the springs 40 described in the previous embodiment. The degree of compression of the springs 72 again provides a pre-load force which is applied via the washer 70 to the balls 68.

As with the previous embodiment, each of the v-shaped notches 62 comprise a pair of angled surfaces 81 and 82. The notches 67 have a generally circular cross-section, so that when the plate 57 is rotated with respect to the spigot 57, the angled surfaces 81 and 82 tend to lift the steel balls 68 upwardly within the notches 67. The steel balls 68 remain within the notches 67 and are lifted against the washer 70 and springs 72 as the v-shaped notch 62 moves out of alignment with the notch 67. The ball is then held between the notches 67 and the chamfered edge 61.

As is the case with the first embodiment, the springs 72 are pre-loaded to a point where further compression of the springs result in a reducing spring force. This means that maximum force is applied to the steel balls 68 when the notches 62 and 67 are aligned. This then results in the maximum holding force between the plate 57 and the spigot 56.

In this embodiment, the six v-shaped notches 62 are provided around the aperture 59. This provides three detent positions. The first is the in-use position, with two detent positions provided for when the mirror is pushed forward and rearwardly. The angular spacing between the v-shaped notches 62 varies depending on the required extent of forward and rearward movement.

In this embodiment, the plate 57 is designed to be located within a tubular arm which extends between a mirror head and a mounting bracket. The plate 57 is provided with curved sides 83 which act to locate the plate 57 within the tubular arm. The spigot 56 is secured to the mirror bracket by the bolt and nut 78 and 79.

Figure 15:
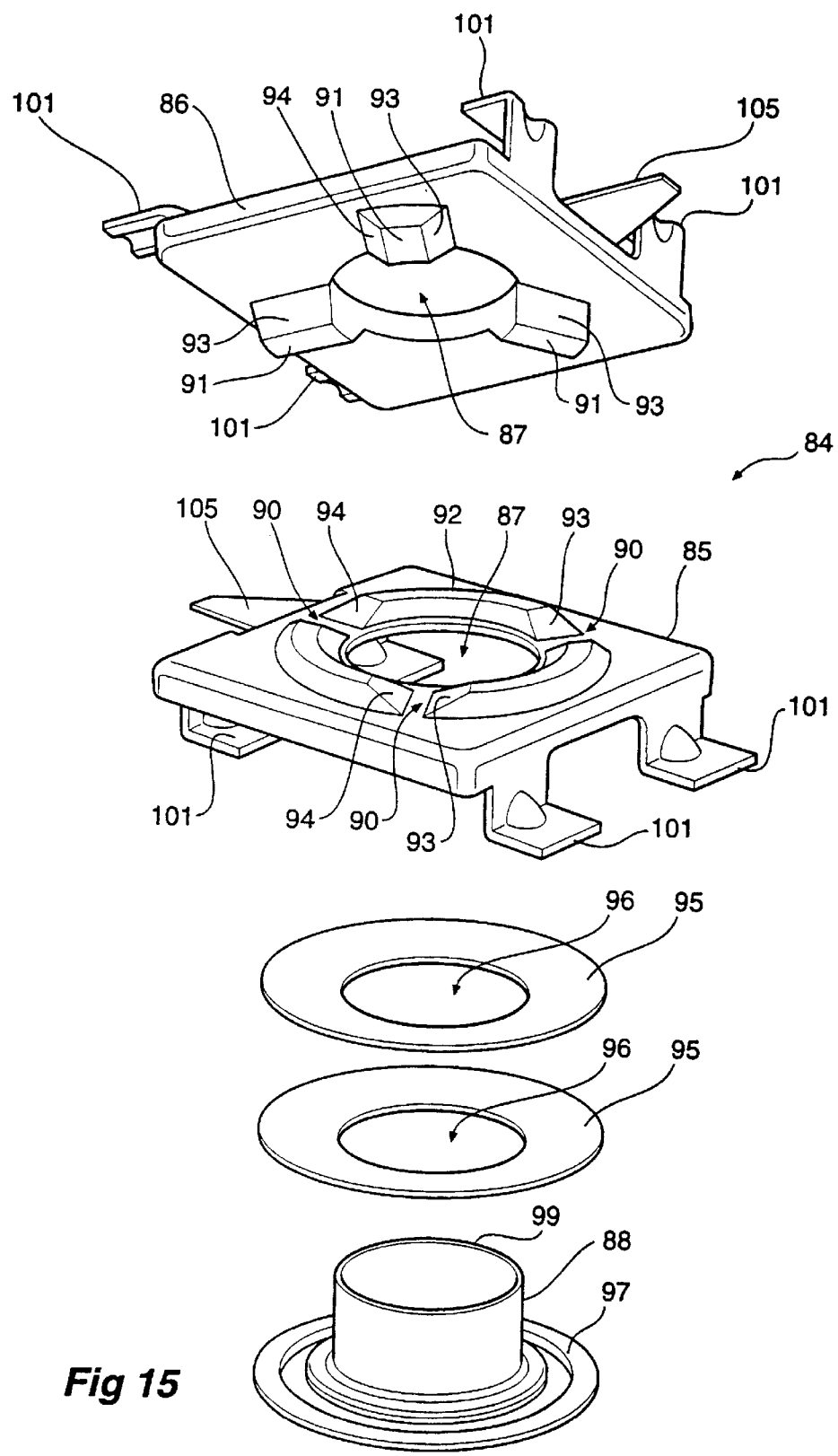
FIG. 15 shows an exploded view of a pivot assembly according to a third embodiments.
Figure 16:
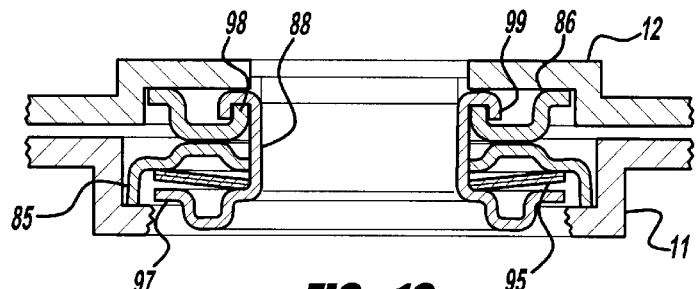
FIG. 16 shows a cross-sectional view of a pivot assembly illustrated in FIG. 15.

FIGS. 15 and 16 illustrate a third embodiment of the invention. This embodiment comprises a first plate 85 and a second plate 86. Each of the plates have a central aperture 87 through which a shaft 88 is located. The shaft 88 allows the first and second plates 85 and 86 to rotate with respect to one another and allows some relative longitudinal movement between the plates 85 and 86. The plates 85 and 86 in this embodiment are pressed metal, and detents are formed between the first and second plate 85 and 86 that comprise v-shaped recesses 90 and v-shaped projections 91. The v-shaped recesses 90 are formed in a raised annular ridge 92 which is pressed outwardly from one side of the plate 85. Each of the v-shaped projections 91 are pressed outwardly from one side of the plate 86. Each v-shaped recess and projection is radially spaced around the center of the apertures 87 so that rotation of one of the plates 85 or 86, with respect to the shaft 88, will result in movement of the projections 91 into and out of the recesses 90.

Each of the recesses and projections comprise a pair of angled surfaces 93 and 94 which slide with respect to one another and therefore cause the plates 85 and 86 to separate with respect to one another. These angled surfaces 93 and 94 provide a mechanical advantage to overcome the spring force which forces the plates 85 and 86 together.

As with the previous embodiments, a spring 95 comprises a concave disc with a center aperture 96. The shaft 88 locates through the aperture 96. The shaft 88 includes a flange 97 which holds the spring 95 captive against the plate 85. To secure the shaft 88, its end 99 is rolled over the circular edge 98 of the aperture 87 in plate 86. The required pre-load is applied on the spring 95 before the rolling operation.

Rotation of the first plate 85 with respect to the second plate 86 results in the plates 85 and 86 separating longitudinally along the shaft 88. This separation is resisted by the spring 95. As with the previous embodiments, further deflection of the spring 95 beyond its pre-load position results in the spring force reducing thereby also reducing the force required to disengage the projections 91 from the recesses 90. Once disengaged, the projections 91 slide around the upper surface of the ridge 92. Once the projections 91 are brought back into alignment with the recesses 90, the spring force will again increase and clamp the plates 85 and 86 together.

Both the first and third embodiment connect in a similar manner to the mirror head 11 and vehicle bracket 12. In the first embodiment, the bracket plate 13 has tabs 101 that project from the bracket plate 13 and are in a plane slightly below the bracket plate 13. The vehicle bracket 12 has apertures 102 within which the tabs 101 locate. The bracket plate 13 is then pushed in a direction to enable the tabs 101 to engage slots 103 that are located within the recesses 102. This holds the bracket plate 13 against the vehicle bracket 12.

Figure 9:
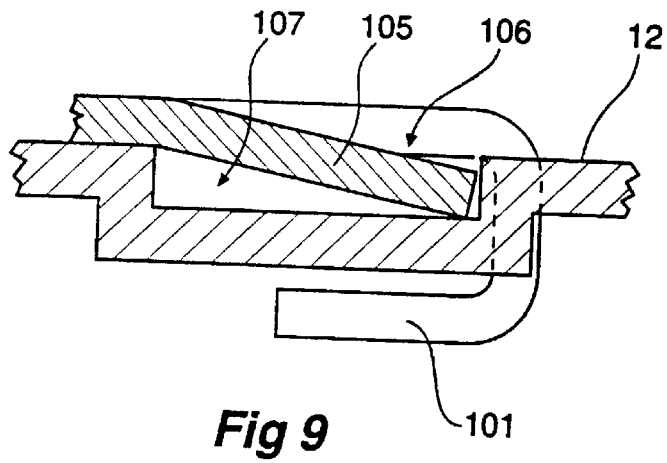
FIG. 9 shows a partial sectional view of a locking tab of the first and third embodiments engaged in a depression.

Locking tabs 105 are formed in the bracket plate 13. A cut 106 extends along the edge of the plate which then enables that edge to be deflected downwardly to form the locking tab 105. The vehicle bracket 12 has corresponding depressions 107 which are engaged by the ends 108 of the locking tabs 105 once the bracket plate 13 is pushed to a position where the tabs 101 are fully engaged. A locking tab 105 engaging a recess 107 is shown in FIG. 9 where the ends 108 of the locking tabs 105 abut against the end of the recesses 107 and thereby hold the bracket plate 13 in position on the vehicle bracket 12.

The case plate 14 has similar tabs 101 that engage corresponding slots within the mirror head 11. Again, locking tabs 105 engage recesses within the mirror head which hold the case plate 14 in place.

A similar attachment means is used in the third embodiment. Again, the tabs 101 that engage corresponding slots in the vehicle bracket 12 and mirror head 11 and there are provided locking tabs 105 that engage recesses in the mirror head 11 and vehicle bracket 12 to hold the first and second plate 85 and 86 in place.

Both of the attachment means for the first and third embodiments make it very easy to secure the pivot assembly 10 and 84 between a vehicle bracket 12 and mirror head 11. The pivot assemblies 10 and 84 are a module which enable easy connection of the mirror head 11 to a vehicle bracket 12.

Figure 12:
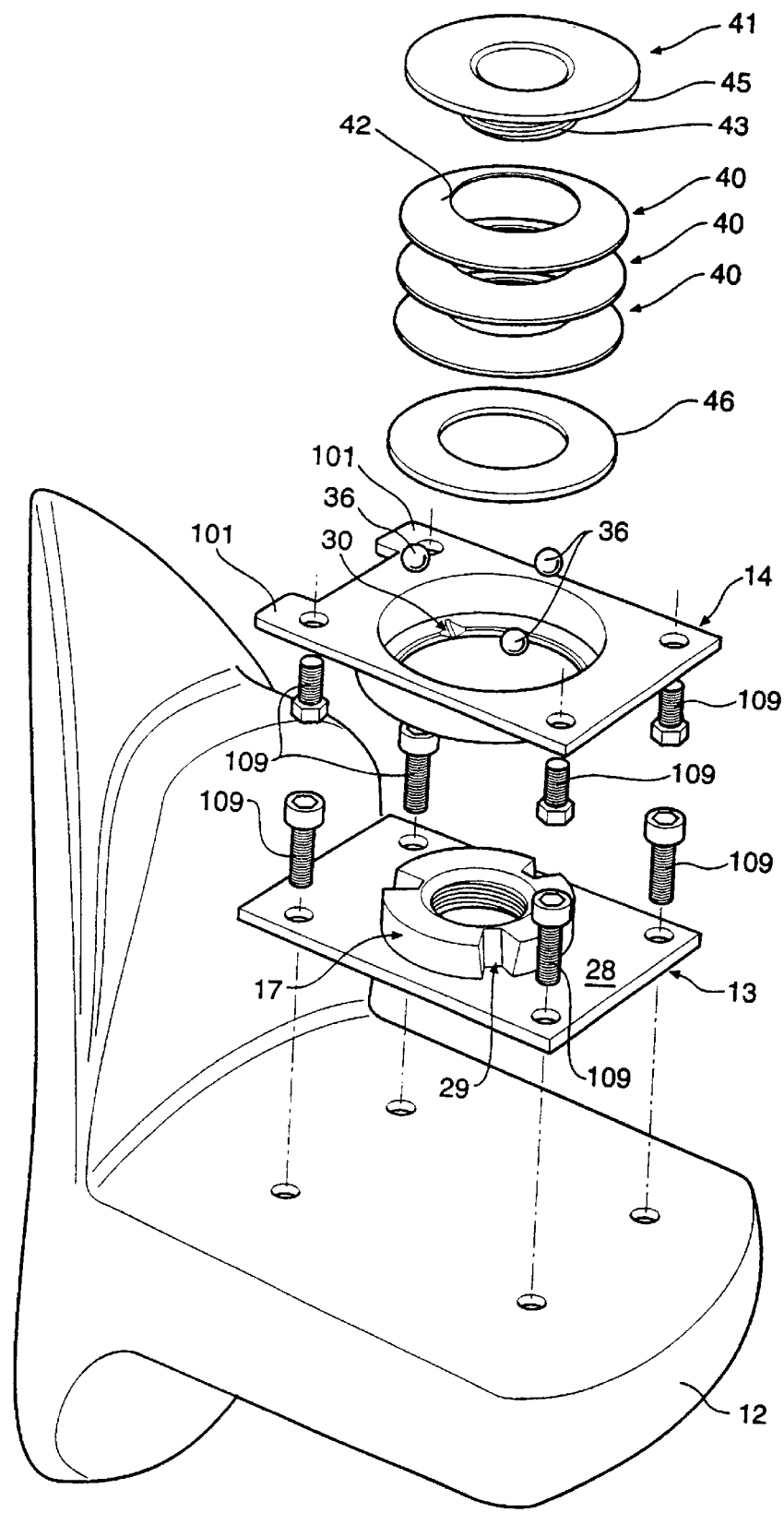
FIG. 12 shows an exploded view of a pivot assembly and a mirror mounting bracket according to the first embodiment showing an alternative attachment method.

Alternatively, as shown in FIG. 12, threaded fasteners 109 may be used to secure the case plate 14 and bracket plate 13 to the mirror head 11 and vehicle bracket 12.

Figure 17:
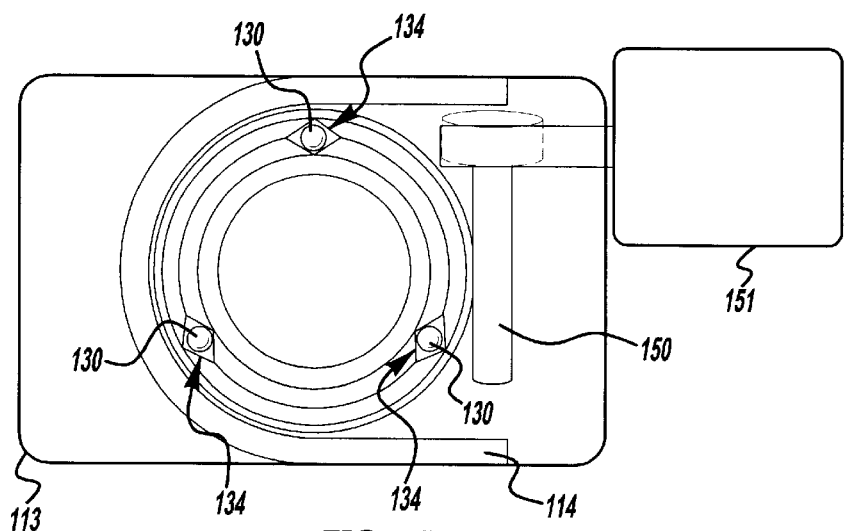
FIG. 17 shows a plan view of a pivot assembly having an electric motor for rotating the pivot according to a fourth embodiment.
Figure 18:
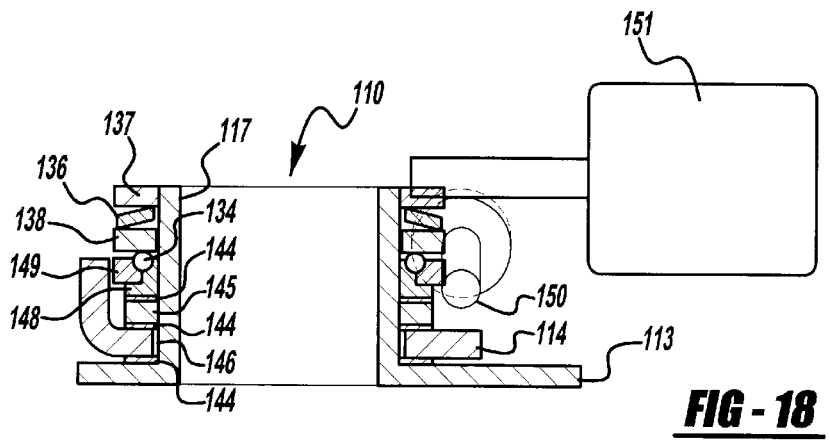
FIG. 18 is a cross-sectional view of FIG. 17.
Figure 19:
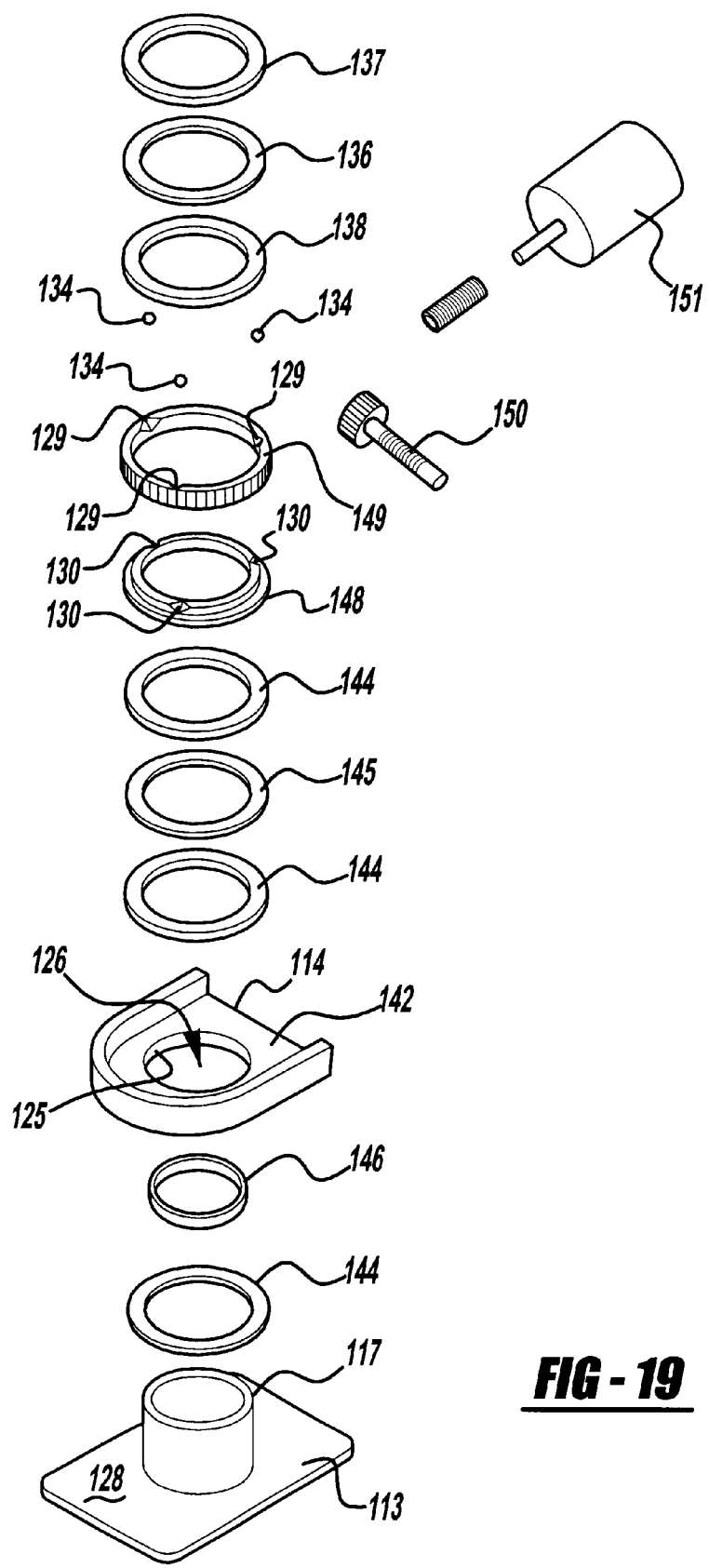
FIG. 19 is an exploded view of the pivot assembly of FIGS. 18 and 19.

A fourth embodiment of the invention is shown in FIGS. 17–19. In this embodiment, the pivot assembly 110 incorporates an electric motor drive which can be used to either fold the mirror to a parked position when required, or provides motorized mirror adjustment about one axis only. This type of mirror is known as a mono-axis mirror. In the case of a parking mechanism, it is often required to bring the outermost portion of the wing mirror as close as possible to the vehicle body when the vehicle is parked. This minimizes the potential for impact to the wing mirror.

In the case of a mono-axis mirror, the mirror is designed to do away with the conventional two axis mirror plane adjustment mechanism which normally comprises two independent motors. Instead, the mirror is designed so that adjustment about a horizontal axis is not required. Therefore, the mirror is provided with a single axis adjustment about a substantially vertical axis.

In the embodiments shown in FIGS. 17–19, the pivot assembly 110 comprises a bracket plate 113 and a case plate 114. The attachment of the bracket plate and case plate 113 and 114 to the mirror head 11 and vehicle bracket 12 is similar to the method used in the first and third embodiments although not illustrated in FIGS. 17–19. Again, the bracket plate 113 is provided with a spigot 117 to which the case plate 114 is journalled for rotation. The case plate 114 has a flange 142 within which an aperture 126 is formed. The aperture 126 is defined by a bearing surface 125.

The aperture 126 enables the flange 142 to locate around the spigot 117.

A number of components are provided which will enable the case plate 114 to be driven electrically around the spigot 117, a spring means which will provide the necessary download force to hold the case plate securely with respect to the bracket plate 113 and an override clutch which will enable the mirror head 11 to break away if impacted or manually moved.

The assembly shown in FIG. 19 comprises a friction washer 144 and bush washer 146 which first locates over the spigot 117. This friction washer 144 locates between the flange 142 and the support surface 128. In this embodiment, there is contact between the aperture 125 and the spigot 117. The bush washer 146 minimizes rotational friction. Next is a further friction washer 144 which is located between a spacer washer 145 and the upper surface of the flange 142. A further friction washer 144 is positioned on the upper surface of the spacer washer 145. Next in the assembly is a clutch ring 148 which engages with a gear wheel 149. The gear wheel 149 is driven by a worm drive 150 which is in turn driven by an electric motor 151. The clutch ring 148 is fixed with respect to the spigot 117. In this embodiment, this is achieved by a press fit, but splines may also be used. The press fit enables the clutch ring 148 to be fixed to the spigot 117 while at the same time ensuring the required clearance with respect to the friction washers 144, flange 142 and spacer washer 145. It allows for the clearance between these components to be controlled so that there is no excessive free-play between the bracket plate 113 and the case plate 114.

FIGS. 18 and 19 show the spring 136 which comprises the same concave spring disc used in the previous embodiments. The spring 136 is held between a spigot washer 137 and a load distribution washer 138.

Detents are provided between the clutch ring 148 and gear wheel 149 which allow for manual breakaway of the mechanism. As will be described below, the detents used in this fourth embodiment are substantially the same as described in the previous embodiments.

The friction washers 144 are chosen depending on the application. In the case of a mono-axis mirror, the friction washers 144 are designed to provide sufficient friction to movement and to restrain unwanted movement of the mirror head 11 when in its deployed position. Due to backlash within the worm drive 150 and gear wheel 149, there will be some potential for the mirror head 11 to move within the extent of this backlash. However, the friction resulting from the three friction washers 144 is high enough so that movement of the mirror head 11 within this backlash will not occur. Accordingly, the friction washers 144 are selected to provide stable location of the mirror head 11. In the case of parking the mirror head 11, the friction washers 144 are chosen so that they lower the friction forces.

In the case of the mono-axis mirror, electric motor 151 needs to be powerful enough to overcome the friction force provided by the friction washers 144. Provided that sufficient drive force is provided, the mirror head 11 and case plate 114 can be made to rotate around the spigot 117 provided that the disengagement force of the detents is greater than the force required to rotate the case plate 114. This prevents the detents from disengaging while the electric motor 151 is driving the case plate 114 around the spigot 117.

The electric motor 151 and worm drive 150 are secured with respect to the case plate 114. Accordingly, as the gear wheel 149 is held stationary with respect to the spigot 117, operation of the worm drive 150 will cause it, and any components to which it is attached, to be driven around the gear wheel 149 and spigot 117.

The electric motor 151 can be fitted with conventional sensors to determine current overload which can be used to automatically de-energize the electric motor 151. Accordingly, if stops are encountered by either the mirror head 11 or case plate 114, current rises will occur which can then be used to cease mirror head 11 movement.

If the mirror head 11 is manually rotated or is impacted, the force of rotation will be transferred via the worm drive 150 directly to the gear wheel 149. Accordingly, the gear wheel 149 will tend to rotate independently of the clutch ring 148. The upper surface of both the clutch ring 148 and the gear wheel 149 are provided with aligned v-shaped notches 129 and 130 which are similar to those described for the previous embodiments. In addition, steel balls 134 also locate within the aligned notches 129 and 130. The notches 130 are designed to move the steel balls 134 into notches 129 while at the same time lifting the steel balls vertically against the washer 138.

Accordingly, manual rotation of the mirror head 11 will result in the detents disengaging to allow movement of the mirror head 11. Operation of the detent will be exactly the same as that for the previous embodiments.

As with the previous embodiments, the spring 136 has a negative spring rate after being pre-loaded so that the load applied to the steel balls 134 decreases as each of the steel balls 134 move into the notch 129. This in turn reduces the resistance to rotation provided by each of the friction washers 144.

The electric motor 151 is designed so that it can adopt a number of positions around the gear wheel 149. The orientation of the electric motor 151 can range from flat and in line with the general plane of the pivot 10 to an acute angle between the pivot 110 and the motor 151. This will enable the pivot assembly 110 and motor 151 to be adjusted so that it can locate conveniently within a number of mirror head designs.

What is claimed is:

1. A pivot between the mirror head and mirror mounting bracket of a rear vision mirror comprising:
    a spigot on said mirror mounting bracket or the mirror head;
    an aperture in said mirror head journalled to said spigot so that said mirror head may rotate with respect to said mirror mounting bracket;
    a detent between said mirror mounting bracket and said mirror head that changes from a locked position, where said mirror head is held in a selected position with respect to said mirror mounting bracket, to a disengaged position as said mirror head is rotated with respect to said mirror mounting bracket; and
    a spring assembly fixed with respect to said spigot and applying force to engage said mirror head against said detent, said spring having a negative spring rate when compressed from a pre-loaded position.

2. The pivot according to claim 1, wherein said spring, comprises a circular disc having a concave periphery.

3. The pivot according to claim 2, wherein said spring further comprises an aperture in the center of said disc and said disc having a conical cross-section in a plane containing the axis of said disc.

4. The pivot according to claim 3, wherein said disc has a positive spring rate for the first part of its deflection and a negative spring rate following said first part of deflection.

5. The pivot according to claim 4, wherein said spring is pre-loaded against said detent so that the maximum spring force is applied in said locked position and so that the spring force decreases during movement of said detent to said disengaged position.

6. A pivot assembly according to claim 1 wherein the detent arrangement includes a plurality of first radially spaced recesses associated with the spigot, a plurality of second radially recesses associated with the aperture that each align with a corresponding first recess in the spigot and a detent element located between each aligned first and second recess that engages in each aligned first and second recess to lock the detent arrangement and that moves out of one of the recesses to disengage the detent arrangement.

7. A pivot assembly according to claim 6 wherein the detent elements comprise balls.

8. A pivot assembly according claim 6 wherein the aperture is associated with an aperture plate and the recesses associated with the aperture comprise v-shaped notches in the aperture plate around the periphery of the aperture.

9. A pivot assembly according to claim 8 wherein the detent elements have surfaces defining a v-shaped projection that abut against the v-shaped notches.

10. A pivot assembly according to claim 8 wherein each of the v-shaped notches comprises a pair of ramped surfaces, each of which are also at an angle with respect to the axis of the spigot.

11. A pivot assembly according to claim 10 wherein the ramped surfaces cause the detent elements to move away from the v-shaped notches while remaining engaged with the recesses in the spigot.

12. A pivot assembly according to claim 11 wherein the aperture plate has a chamfered surface around the periphery of the aperture, the detent elements being held between the chamfered surface and the recesses in the spigot when the v-shaped notches are moved out of alignment from the recesses in the spigot.

13. A pivot assembly according to claim 7 further comprising a washer between the balls and the spring assembly, the balls moving against the and the spring as the pivot assembly moves from a locked to disengaged position.

14. A pivot assembly according to claim 13 further comprising a threaded fastener that connects to the spigot and that holds the spring assembly and detent assembly to the spigot.

15. A pivot assembly as in claim 1 wherein the spigot is mounted on a spigot plate and the aperture is associated with an aperture plate.

16. A pivot assembly as in claim 15 wherein the spigot plate is adapted to be mounted onto the mirror mounting bracket and the aperture plate is adapted to be mounted to the mirror head.

17. A pivot assembly connecting the mirror head and mirror mounting bracket of a rear vision mirror comprising:
    a spigot having a plurality of first radially spaced recesses;
    a plate having an aperture journalled to said spigot, wherein said aperture has a chamfered surface around the periphery of said aperture;

one or more v-shaped notches located in said periphery of said aperture, wherein said v-shaped notches have a pair of ramped surfaces positioned at an angle with respect to the axis of said spigot;

one or more balls positioned between said plate and said spigot that change from a locked position, where said plate is held with respect to said spigot, to a disengaged position by rotation of said plate with respect to said spigot, wherein said ramped surfaces cause said one or more balls to move away from said v-shaped notch while remaining engaged with said recesses in said spigot, wherein said one or more balls are held between said chamfered surface and said recess in said spigot when said v-shaped notches are moved out of alignment from said recesses in said spigot;

a spring acting against said one or more balls to hold them in said locked position, said spring yielding to allow said one or more balls to move to a disengaged position as said plate is rotated with respect to said spigot; and attachment means on both said spigot and plate that allow said spigot to be secured to either one of said mirror head or said mirror mounting bracket and said plate to be secured to either one of said mirror head or said mirror mounting bracket to enable said mirror head to be held, or rotated, with respect to said mirror mounting bracket.

18. A pivot assembly connecting the mirror head and mirror mounting bracket of a rear vision mirror comprising:

a spigot having a plurality of first radially spaced recesses;

a plate having an depression comprising a substantially tubular wall extending from one side of said plate and a circular flange located at the end of said tubular wall spaced from said plate and extending radially inward from said tubular wall, the inner periphery of said flange comprises an aperture located within said depression and journalled to said spigot, wherein said aperture has a chamfered surface around the periphery of said aperture;

one or more v-shaped notches located in said periphery of said aperture, wherein said v-shaped notches have a pair of ramp surfaces positioned at an angle with respect to the axis of said spigot;

one or more balls positioned between said plate and said spigot that change from a locked position, where said plate is held with respect to said spigot, to a disengaged position by rotation of said plate with respect to said spigot, wherein said ramped surfaces cause said one or more balls to move away from said v-shaped notch while remaining engaged with said recesses in said spigot, wherein said one or more balls are held between said chamfered surface and said recess in said spigot when said v-shaped notches are moved out of alignment from said recesses in said spigot;

a spring acting against said one or more balls to hold them in said locked position, said spring yielding to allow said one or more balls to move to a disengaged position as said plate is rotated with respect to said spigot; and attachment means on both said spigot and plate that allow said spigot to be secured to either one of said mirror head or said mirror mounting bracket and said plate to be secured to either one of said mirror head or said mirror mounting bracket to enable said mirror head to be held, or rotated, with respect to said mirror mounting bracket.

19. A pivot assembly connecting a mirror head and a mirror mounting bracket of a rear vision mirror comprising:

a spigot having a flange at one end that extends radially outward from said spigot;

a plate abutting against said flange, wherein said plate is attached to said mirror head;

an aperture in said plate journalled to said spigot;

a spigot plate from which said spigot projects that extends parallel to said plate containing said aperture, wherein said spigot plate is attached to said mirror mounting bracket;

a detent between said plate and said spigot that changes from a locked position, where said plate is held with respect to said spigot, to a disengaged position by rotation of said plate with respect to said spigot;

a spring acting against said detent to hold it in said locked position, said spring yielding to allow said detent to move to a disengaged position as said plate is rotated with respect to said spigot;

an attachment means on both said spigot and plate that allows said spigot to be secured to either one of said mirror head or said mirror mounting bracket and said plate to be secured to either one of said mirror head or said mirror mounting bracket to enable said mirror head to be held, or rotated with respect to said mirror mounting bracket, wherein said attachment means further comprises:

a plurality of tabs projecting from said spigot plate and said plate, and said mirror mounting bracket and said mirror head further comprise a plurality of slots positioned so that each of said tabs locates within a slot to thereby position said pivot assembly with respect to said mirror head and mirror mounting bracket.

20. The pivot assembly according to claim 19, wherein said tabs are engaged into said slots by inserting said tabs into the opening of said slot and moving said pivot assembly in a direction that is substantially transverse to the axis of said spigot to fully engage said tabs.

21. The pivot assembly according to claim 20, further comprising at least one locking tab on each of said spigot plate and plate and a recess in said mirror mounting bracket and mirror head that said locking tab engage into once said pivot assembly has been moved into position.

22. The pivot assembly according to claim 21, wherein each said locking tab is formed by a cut extending along the edge of each of said spigot plate and plate, said tab deflected away from the plane of said plates so that the end of said tab is spaced from the plane of said plates.

23. A pivot assembly connecting the mirror head and mirror mounting bracket of a rear vision mirror comprising:

a first plate;

an aperture in said first plate;

a second plate;

an aperture in said second plate that aligns both said aperture in said first plate;

a shaft journalled through both said apertures, said first and second plate rotating and separating with respect to each other about and along the axis of shaft;

a detent between said first and second plates that changes from a locked position, wherein said first and second plates are held with respect to each other, to a disengaged position by rotation of said first and second plates with respect to each other, said movement between said locked position to said disengaged position causing said first and second plates to disengage;

a spring acting to push said first and second plates together and to resist separation of said first and second plates; and an attachment means on both said first and second plates that allow both to be attached to either said mirror mounting bracket or said mirror head, wherein said attachment means has a plurality of tabs projecting from said first and second plates, and said mirror mounting bracket and said mirror head further comprise a plurality of slots positioned so that each of said tabs are located within a slot to thereby position said pivot assembly with respect to said mirror head and said mirror mounting bracket.

24. The pivot assembly according to claim 23, wherein said tabs are engaged into said slots by inserting said tabs into the opening of said slot and moving said pivot assembly in a direction that is substantially transverse to the axis of said shaft to fully engage said tabs.

25. The pivot assembly according to claim 24, further comprising at least one locking tab on each of said first and second plates and a recess in said mirror mounting bracket and mirror head that said locking tab engage into once said pivot assembly has been moved into position.

26. The pivot assembly according to claim 25, wherein each said locking tab is formed by a cut in and extending along the edge of each said plate, said tab deflected away from the plane of said plates so that the end of said tab is spaced from the plane of said plates.

27. A pivot assembly connecting the mirror head and mirror mounting bracket of a rear vision mirror comprising:

a spigot;

a plate;

a depression in said plate having a substantially tubular wall extending from one side of said plate and a circular flange located at the end of said tubular wall spaced from said plate and extending radially inward from said tubular wall;

an aperture formed from the inner periphery of said flange of said depression, wherein said aperture is journalled to said spigot;

a detent between said plate and said spigot that changes from a locked position, where said plate is held with respect to said spigot, to a disengaged position by rotation of said plate with respect to said spigot, wherein said detent has a plurality of radially spaced recesses in said spigot, a plurality of v-shaped notches in said plate about the periphery of said aperture, wherein said v-shaped notches align with said recesses in said spigot, and a plurality of balls located between each said aligned v-shaped notch and said recess to lock said detent and move out of one of said recess or said v-shaped notch to disengage said detent;

a spring comprising a concave circular disc located within said depression and connected to said spigot, that acts against said detent to hold it in said locked position, said spring yielding to allow said detent to move from a disengaged position as said plate is rotated with respect to said spigot;

a washer between said plurality of balls and said spring, said plurality of balls moving against said washer and said spring as said pivot assembly moves from a locked to disengaged position; and attachment means on both said spigot and plate that allow said spigot to be secured to either one of said mirror head or mirror mounting bracket and said plate to be secured to either one of said mirror head or said mirror mounting bracket to enable said mirror head to be held, or rotated with respect to said mirror mounting bracket.

28. The pivot assembly according to claim 27, further comprising a threaded fastener that connects to said spigot and that holds said spring washer and detent elements within said depression which holds said plate to said spigot.

29. The pivot assembly according to claim 28, wherein said spigot further comprises a flange at one end that extends radially outwardly from said spigot, said plate abutting against said flange.

30. The pivot assembly according to claim 29, further comprising a spigot plate from which said spigot projects that is parallel to said plate containing said aperture.

\* \* \* \* \*

UNITED STATES PATENT AND TRADEMARK OFFICE
CERTIFICATE OF CORRECTION

PATENT NO. : 6,742,756 B1
DATED : June 1, 2004
INVENTOR(S) : Garry Fimeri et al.

It is certified that error appears in the above-identified patent and that said Letters Patent is hereby corrected as shown below:

Title page,
Item [75], Inventors, "Gary" should be -- Garry --.

Column 2,
Line 56, "disc have" should be -- disc will have --.

Column 3,
Line 67, "embodiments;" should be -- embodiment; --.

Column 5,
Line 20, "is," should be -- is --.
Line 40, "When" should be -- when --.

Signed and Sealed this

Twenty-sixth Day of July, 2005

JON W. DUDAS
*Director of the United States Patent and Trademark Office*